United States Patent [19]

Takahashi et al.

[11] Patent Number: 5,011,201
[45] Date of Patent: Apr. 30, 1991

[54] FRONT STRUCTURE OF VEHICLE BODY

[75] Inventors: Hisao Takahashi, Higashihiroshima; Kaoru Yamane, Hiroshima; Kiyomi Hirakami, Hiroshima; Kazuo Ikeda, Hiroshima, all of Japan

[73] Assignee: Mazda Motor Corporation, Hiroshima, Japan

[21] Appl. No.: 216,660

[22] Filed: Jul. 7, 1988

[30] Foreign Application Priority Data

Jul. 10, 1987 [JP] Japan .................... 62-106895

[51] Int. Cl.⁵ .............................. B62D 23/00
[52] U.S. Cl. .................... 296/203; 296/194; 296/204; 296/209; 296/30
[58] Field of Search .......... 296/30, 194, 203, 209, 296/204

[56] References Cited

U.S. PATENT DOCUMENTS 4,372,575  2/1983  Hyma .................... 280/661
4,669,776  6/1987  Harasaki ................ 396/194
4,804,222  2/1989  Sakiyama et al. ....... 296/209 X

FOREIGN PATENT DOCUMENTS 0140281   8/1982  Japan .................... 296/204
0161613   1/1983  Japan .................... 296/203
59-122973 8/1984  Japan .
0169376   7/1986  Japan .................... 296/209

Primary Examiner—Dennis H. Pedder
Attorney, Agent, or Firm—Fleit, Jacobson, Cohn, Price, Holman & Stern

[57] ABSTRACT

A front structure for a vehicle body including a front frame which extends in the longitudinal direction of the side of the engine room of the vehicle. The front frame is formed of an outer frame and an inner frame connected together to form a closed cross section. A dashboard lower panel is disposed near the rear edge of the front side frame and extends vertically. A front floor extends rearward from the lower edge of the dashboard lower panel. A side sill extends in the longitudinal direction along the side of the front floor and is formed of an outer frame and an inner frame connected together to form a closed cross section. The side sill has a projection on its inward side at front end thereof which is connected to the rear portion of the front side frame.

6 Claims, 6 Drawing Sheets

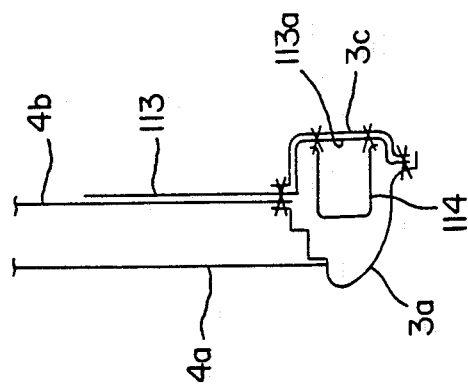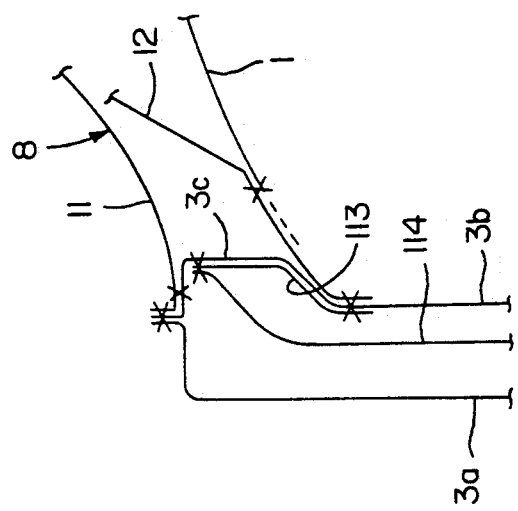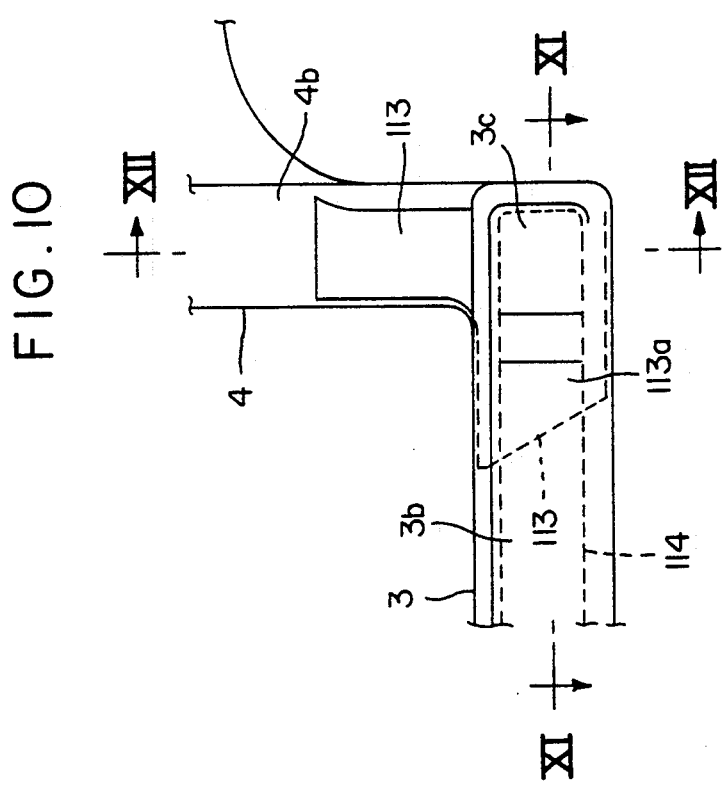

FRONT STRUCTURE OF VEHICLE BODY

FIELD OF THE INVENTION

This invention relates to a front structure of a vehicle body and, more particularly, to a connecting structure between a front side frame and a side sill.

BACKGROUND OF THE INVENTION

A front structure is known in the art comprised of a side sill extending in the longitudinal direction of the vehicle body, disposed in the side portion of the floor panel and connected to a rear portion of a front side frame and a lower portion of a front pillar at the front end thereof. The front side frame extends in the longitudinal direction of the vehicle body and is connected to a side wall constituting part of an engine room. For example, Japanese Utility Model Public Disclosure No. 59-122973 discloses a front structure having a side sill. A step portion is provided on the upper surface of the side sill at the front end thereof. The front pillar is connected to the step portion at the lower portion thereof. On the other hand, it is well known in such a front structure that the rear end of the front side frame and the front inside surface of the side sill are connected to each other through a flange member. Furthermore, U.S. Pat. No. 4,372,575 discloses a front structure having a strut mounting tower connected to the side wall constituting part of an engine room. A strut member is mounted to the strut mounting tower at the upper portion thereof, and the upper portion of the strut member inclines to the inside of the vehicle body.

In the front structure of a vehicle as described above, the strut member inclines to the inside of the vehicle body so that when the load front the strut member inputs to the strut mounting tower. The component force of the load to the inside direction acts on the strut mounting tower. The front side frame receives the component force, because the front side frame and the strut mounting tower are connected to the same side wall. The rear end of the front side frame is connected to the front inside surface of the side sill so that the component force acts at the right angle direction to the connecting plane between the front side frame and the side sill. This structure is disadvantageous because of the unreliability of the connection between the front side frame and the side sill.

SUMMARY OF THE INVENTION

The primary object of the present invention is to provide an improved front structure of a vehicle which can ensure a sufficient rigidity of the vehicle body. In accordance with the present invention, the novel front structure of a vehicle body comprises a front frame which extends in the longitudinal direction of the side of the engine room and has a closed cross section. A dashboard lower panel is disposed near the rear edge of the front frame and extends vertically. A front floor extends rearward from the lower edge of the dashboard lower panel. A side sill extends in the longitudinal direction and has a closed cross section. The side sill has a projecting portion projected inwardly of the vehicle at the front end thereof, and the projecting portion is connected to the rear portion of the front side frame.

BRIEF DESCRIPTION OF THE DRAWINGS

FIG. 10 is a side view of still another embodiment of the present invention showing the front structure;

FIG. 11 is a sectional view taken along line XI—XI of FIG. 10;

FIG. 12 is a sectional view taken along line XII—XII of FIG. 10.

DETAILED DESCRIPTION OF PREFERRED EMBODIMENT

Figure 1:
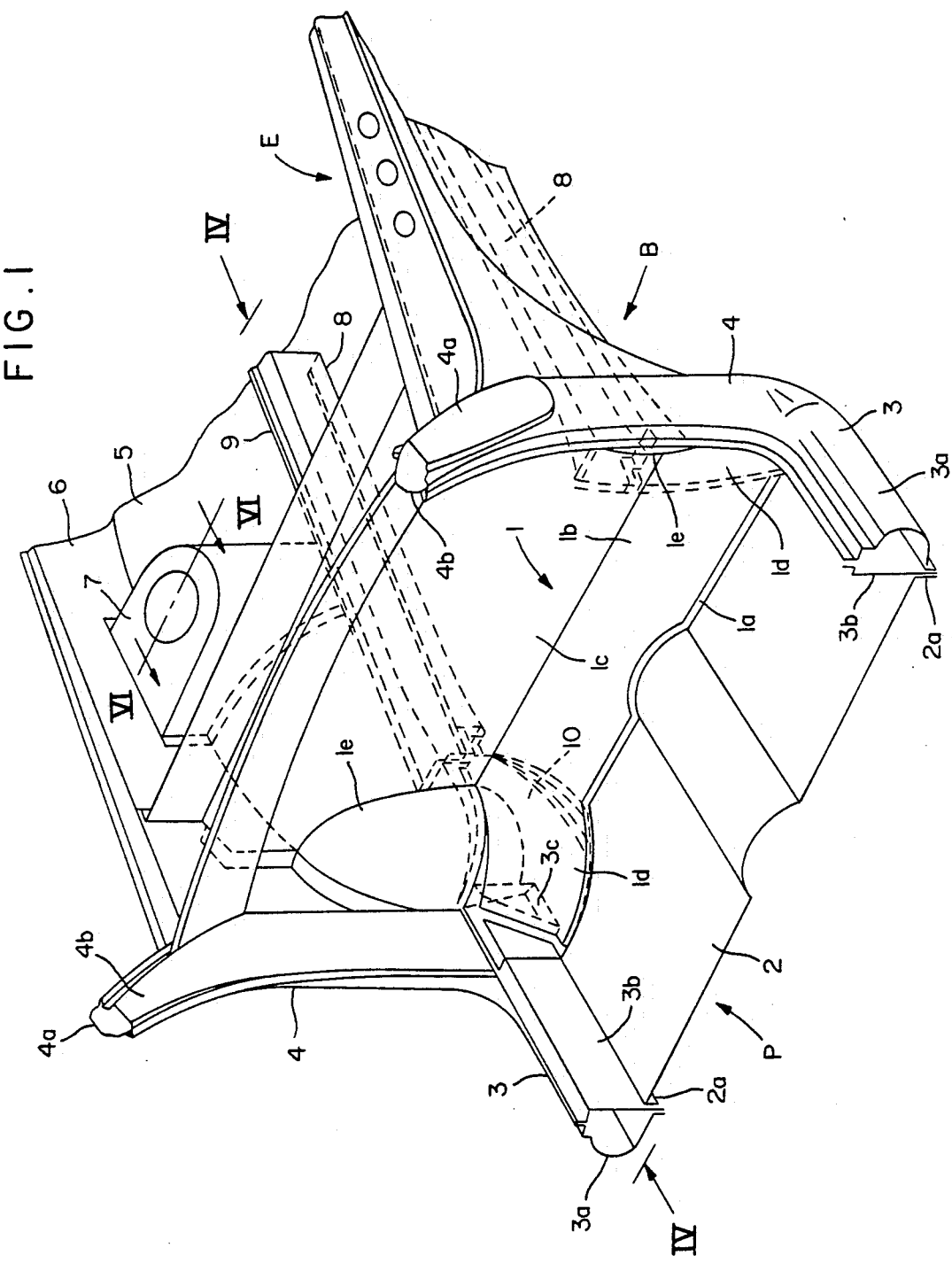
FIG. 1 is a fragmentary perspective view of an embodiment of the present invention showing a novel front structure of a vehicle body in accordance with the teachings of the present invention.
Figure 2:
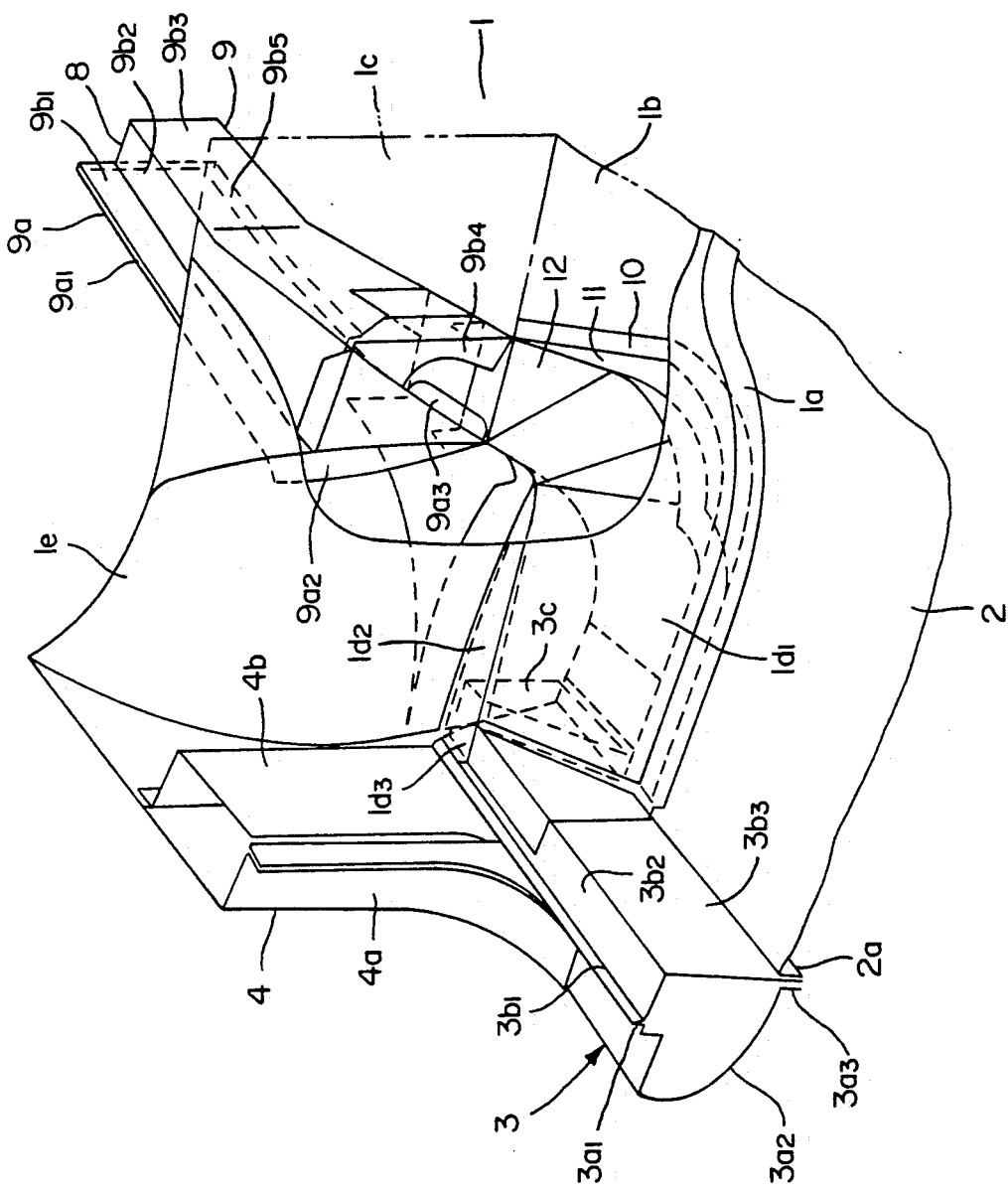
FIG. 2 is a detailed perspective view of the left side of the novel front structure shown in FIG. 1.

A preferred embodiment is shown in FIG. 1 and FIG. 2. As shown a dashboard lower panel 1 extends vertically for separating a passenger room P from an engine room E. All references to inward or outward are with respect to the vehicle body unless otherwise stated. Throughout the terms "edge" and "corner" are used interchangeably. In the drawings "x" shows a spot used. A lower flange 1a of the dashboard lower panel 1 is fixed to a front corner or edge of a floor panel 2. Side sills 3,3 are provided in the longitudinal direction of vehicle body B along outer: corners or degrees of the floor panel 2, respectively. Each side sill 3 is composed of an outer panel 3a and an inner panel 3b. The outer panel 3a is formed with an upper flange 3a1, an arch shaped member 3a2 and a lower flange 3a3. The inner panel 3b is formed with an upper flange 3b1, an upper horizontal member 3b2 and a vertical flat member 3b3. The upper flange 3a1 and the upper flange 3b1 are aligned and fixed to each other, and the lower flange 3a3 and the lower corner or edge of the vertical flat member 3b3 are fixed to each other to form a closed cross section. A side flange 2a of the floor panel 2 is fixed to the inner lower corner or edge of the vertical flat member 3b3 of side sill 3.

Figure 3:
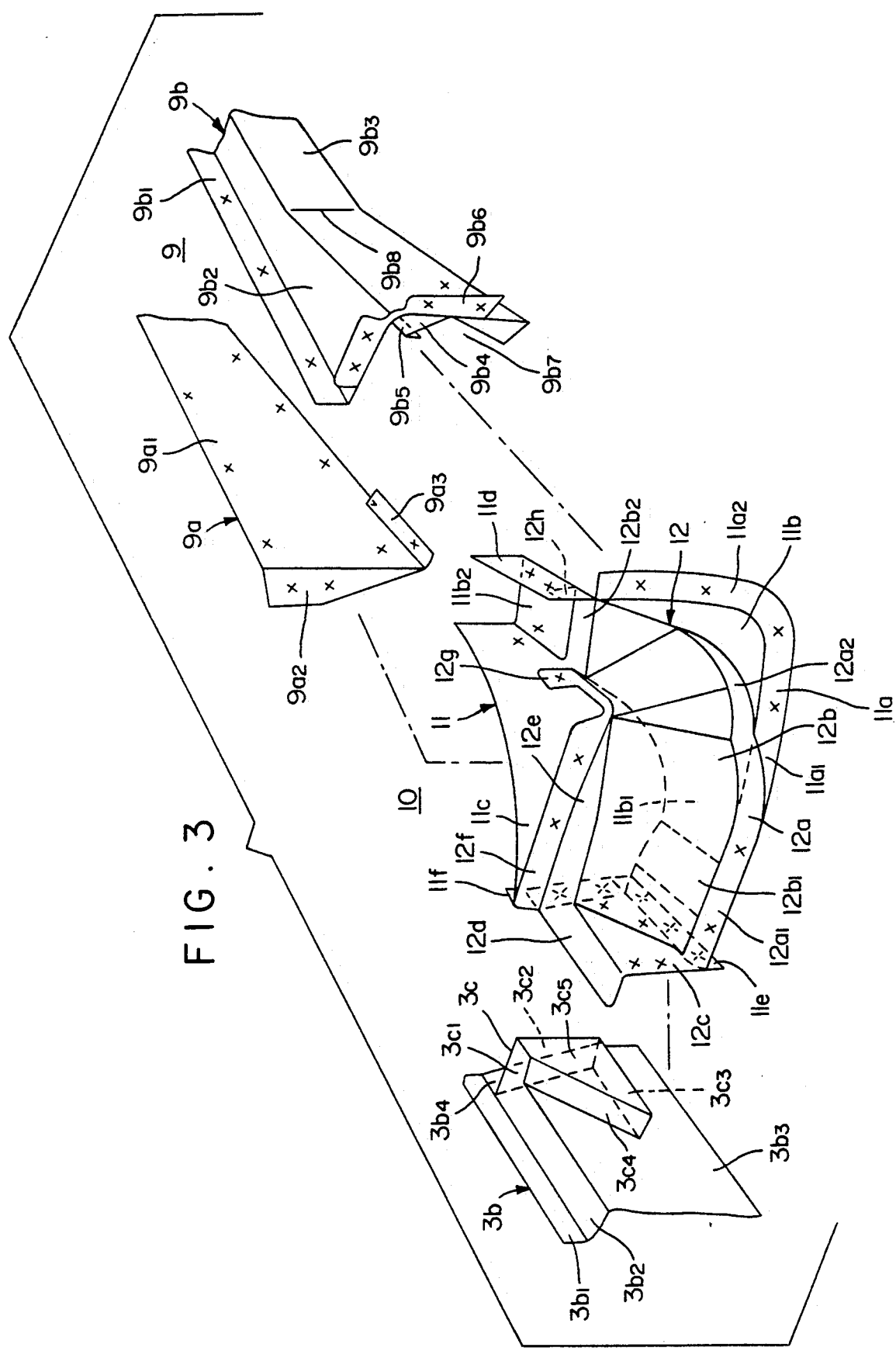
FIGS. 3a-d are perspective views of a front member and a rear member of a front side frame, and the two parts of an inner panel of a side sill, respectively, in the front structure of FIG. 2.

A projection 3c is formed at the front end of the vertical flat member or surface 3b3 of the side sill 3 and projects to the inside direction of the vehicle body B. The projection 3c is of truncated pyramid shape and has an upper surface 3c1 flush with and forming an extension of the upper horizontal member 3b2, a front surface 3c2 which extends vertically, a lower surface 3c3 parallel to the upper surface 3c1, a rear surface 3c4 slanting rearward and downward and an inner surface 3c5 parallel to the vertical flat member 3b3 (as shown in FIG. 3).

Front pillars 4,4 are provided at the front ends of the side sills 3,3, respectively. Each front pillar 4 is composed of an outer panel 4a and an inner panel 4b. The lower end of the outer panel 4a is fixed to the outer panel 3a of the side sill 3, and the lower end of the inner panel 4b is sandwiched between and fixed to the upper flange 3a1 of the outer panel 3a and the upper flange 3b1 of the inner panel 3b of the side sill 3.

The dashboard lower panel 1 has a rank surface portion 1b which extends obliquely upward to the engine room E from the front corner or edge of flange 1a, and a vertical surface portion 1c which extends substantially vertically from the upper edge or corner of the rank surface portion 1b.

Curved surface portions 1d,1d are formed at each outer side of the rank surface portion 1b. Each curved surface portion 1d is composed of an arch shaped surface portion 1d1 which extends upward to the engine room E from the lower flange 1a and whose outer corner or edge keeps a predetermined distance from the vertical flat member 3b3, and a horizontal flat surface portion 1d2 which extends horizontally from the upper corner of the arch shaped surface portion 1d, to the engine room E and whose outer edge 1d3 extends to the upper horizontal member 3b2 of the side sill 3.

Projection surface portions 1e,1e are formed at each outer side of the vertical surface portion 1c and extend upward from the front corners or edges of the horizontal flat surface portions 1d2.1d2. Each front corner or edge of the projection surface portions 1e.1e are is fixed to a wheel apron 5 and each outer corner of the projection surface portions 1e.1e is fixed to an inner panel 6 which comprises a part of the side wall of the engine room E.

A suspension tower 7 is fixed on the wheel apron 5. Front side frames 8.8 extend along both sides of the engine room E in the longitudinal direction of the vehicle body B, respectively. Each front side frame 8 is composed of a front member 9 and a rear member 10.

Referring to FIG. 2 and FIGS. 3c and d, the front member 9 is composed of an outer member 9a and an inner member 9b. The outer member 9a consist of a vertical flat plate 9a1 formed with a vertical flange 9a2 at the vertical rear corner or edge of the vertical flat plate 9a1. Flange 9a2 fixed from the engine room E side to the front corner or edge of the projection surface portion 1e of the dashboard lower panel 1. A horizontal flange 9a3 extends at a right angle from the lower rear edge of the vertical flat plate 9a1.

The inner member 9b consists of an upper flange 9b1, an upper flat plate 9b2 which extends horizontally inward form the lower edge or corner of the upper flange 9b1, a side flat plate 9b3 which extends vertically downward from the inner edge or corner of the upper flat pate 9b2, a lower flat plate 9b4 which extends horizontally outward form the lower edge or corner of the flat plate 9b3, a lower flange 9b5 which extends vertically downward from the outer edge corner of the lower flat plate 9b4, and a side flange 9b6 which is provided at the rear edge or corner of the upper flat plate 9b2 and the side flat plate 9b3. A cut out 9b7 is provided in the rear edge of the lower flat plate 9b4. Side flat plate 9b3 is bent at 9b8. The upper flange 9b1 and the lower flange 9b5 are fixed to the upper corner and lower corner of the vertical flat plate 9a1, respectively to form a closed cross section. The outer surface of the vertical flat plate 9a1 is fixed to the wheel apron 5 and the suspension tower 7. The side flange 9b6 is fixed to the vertical surface portion 1c of the dashboard lower panel 1.

The rear member 10, shown in FIG. 3b, consists of a connecting member 11 and a reinforcing member 12. The connecting member 11 has an arch shaped flange 11a and has a horizontal flange 11a1 which joins the front edge of the floor panel 2 by overlapping with the lower flange 1a of the dashboard lower panel 1. A vertical flange 11a2 extends upward front the inner edge of the horizontal flange 11a1 and is fixed to the front surface of the rank surface portion 1b of the dashboard lower panel 1. The connecting member 11 has a lower plate member 11b which is composed of a curved plate member 11b, and a flat member 11b2. The curved plate member 11b has a rear corner which connects with the arch shaped flange 11a, an outer corner which connects with the vertical flat member 3b3 of the side sill 3, a front corner which extends outward from the upper edge of the vertical flange 11a2 in parallel with the horizontal flange 11a1 of the arch shaped flange 11a, and a curved corner which extends inward in parallel with the horizontal flange 11a1 from the front edge of the outer corner and then curves frontward to connect with the outer edge of the front corner. The flat member 11b2 defines a rectangular plate whose rear corner is connected with the front corner of the curved plate member 11b1 and whose lower surface is fixed to the upper surfaces of the horizontal flange 9a3 and the lower flat plate 9b4 of the front member 9.

The connecting member 11 has an outer vertical plate member 11c which extends vertically from the curved corner of the curved plate member 11b1 and the outer corner of the flat member 11b2 of the lower plate member 11b. An inner vertical plate member 11d extends vertically from the inner corner of the flat member 11b2 of the lower plate member 11b. A lower outer flange 11e extends downward from the outer corner of the curved plate member 11b, and a front outer flange 11f extends forward from the outer corner of the outer vertical plate member 11c. The inner surface of the front edge portion of the outer vertical plate member 11c is fix to the outer surface of the vertical flat plate 9a1 of the front member 9, and the outer surface of the inner vertical plate member 11d is fixed to the inner surface of the side flat plate 9b3 of the front member 9. The lower outer flange 11e is fixed to the vertical flat member 3b3 of the side sill 3 at just below the lower surface 3c3 of the projection 3c.

Figure 5:
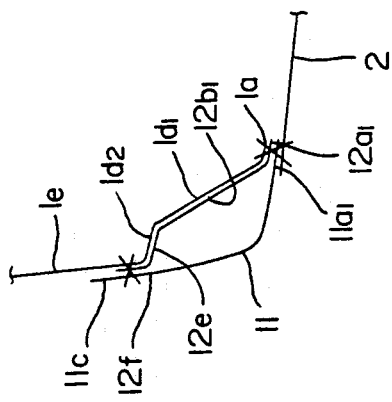
FIG. 5 is a sectioned view taken along line V—V of FIG. 4.
Figure 4:
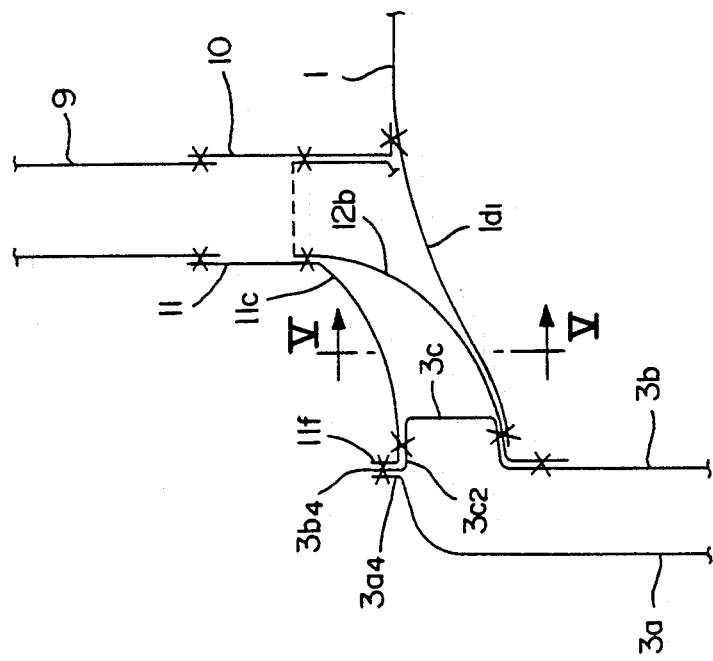
FIG. 4 is a sectional view taken along line IV—IV of FIG. 1.

As shown in FIG. 4, the front outer flange 11f is fixed to a front flange 3b4 of the inner panel 3b of the side sill 3 so that the front flange 3b4 is sandwiched by the front outer lange 11f and a front flange 3a4 of the outer panel 3a of the side sill 3. The outer edge portion of the outer vertical plate member 11c of the connecting member 11 is fixed to the front surface 3c2 of the projection 3. The reinforce member 12 is composed of a lower flange 12a, a curved pate 12b, an outer vertical member 12c, an outer horizontal member 12d, a front horizontal member 12e, a front vertical flange 12f, an outer vertical flange 12g and an inner vertical flange 12h. The lower flange 12a has a horizontal flange 12a1 which is overlapped with the outer side of the horizontal flange 11a1 of the connecting member 11 so that the horizontal flange member 12a1 and the horizontal flange 11a1 are sandwiched between the lower flange 1a of the dashboard lower panel 1 and the front edge of the floor panel 2 (as shown in FIG. 5). A curved flange member 12a2 curves frontward on the curved plate member 11b1 of the connecting member 11. The curved plate 12b has a rank member 12b1 which extends upward and frontward from the front corner of the lower flange 12a whose upper edge or corner extends along the upper corner of the arch shaped surface portion 1d1 of the dashboard lower panel 1, and a flat plate member 12b2 which is overlapped on the flat member 11b2 of the connecting member 11. The outer edge portion of the rank member 12b1 is fixed to the rear surface 3c4 of the projection 3c so that the outer edge portion of the rank member 12b1 is sandwiched between the rear surface 3c4 and the outer edge of the arch shaped surface portion 1d1 of the dashboard lower panel 1 (as shown in FIG. 4). The outer vertical member 12c extends vertically from the outer corner of the lower flange 12a to the upper corner of the vertical flat member 3b3 of the side sill 3. The front corner of the outer vertical member 12c connects to the outer corner of the rank member 12b1 and the rear edge of the outer vertical member 12c is fixed to the vertical flat member 3b3 of the side sill 3. The outer horizontal member 12d extends outward on the upper horizontal member 3b2 of the side sill 3 from the upper corner of the outer vertical member 12c. The front horizontal member 12e extends frontward from the upper corner of the rank member 12b1 overlapping with the horizontal flat surface portion 1d2 of the dashboard lower panel 1.

The front vertical flange 12f extends vertically from the front edge or corner of the front horizontal member 12e and is fixed to the outer vertical plate member 11c of the connecting member 11 so that the front vertical flange 12f is sandwiched between the outer vertical plate member 11c and the lower edge of the projection surface portion 1e of the dashboard lower panel 1 (as shown in FIG. 5). The outer vertical flange 12g extends vertically from the outer corner of the flat plate member 12b2 of the curved plate 12n and is fixed to the outer vertical plate member 11c. Inner vertical flange 12h extends vertically from the inner corner of the flat plate member 12b2 of the curved plate 12b and is fixed to the inner vertical plate member 11d of the connecting member 11.

Therefore, as described, the rear member 10 connects the front member 9 with the front end of the side sill 3, and the connecting member 11 of the rear member 10 and the dashboard lower panel 1 forms a closed class section which connects with the closed class section of the front member 9. Also, the reinforcing member 12 divides the closed class section which is formed by the connecting member 10 and the dashboard lower panel 1, and forms a "node".

The aforementioned fixation of the several members is achieved by spot welding, with each spot welding points shown in FIGS. 3.4 and 5 by an "x".

Figure 6:
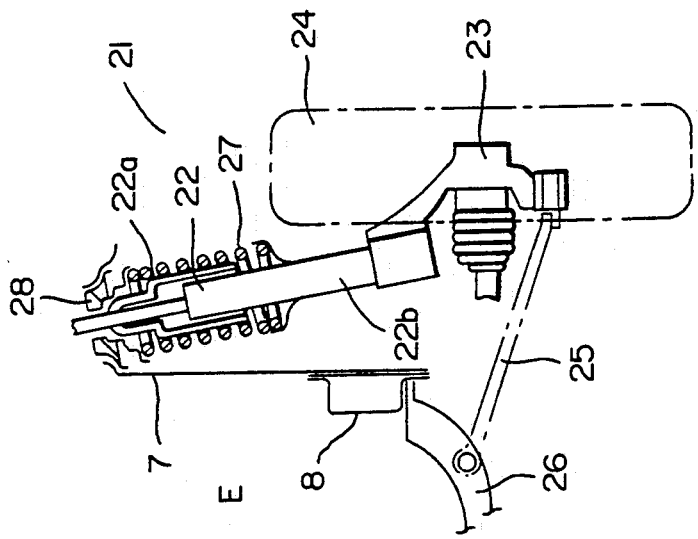
FIG. 6 is a sectional view taken along line VI—VI of FIG. 1.

In FIG. 6, a front suspension assembly 21 is shown at each side of the vehicle body B. The suspension assembly 21 is of well known type including a strut member 22 comprised of upper and lower telescopic members 22a, 22b. A wheel support or carrier member 23 is connected to the lower telescopic member 22b of the strut member 22. Carrier 23 supports a wheel 24 for rotation. The front suspension assembly 21 further includes a lower control arm 25 extending laterally from the wheel support member 23 to a cross member 26 of the vehicle frame. Member 26 is connected to the front side frame 8. The upper telescopic member 22a of the strut member 22 is mounted to the suspension tower 7. The strut member 22 is tilted inward to the engine room E. A coil spring is tilted 27 and rubber bushing 28 complete the suspension assembly 21.

As will be understood from the description above and from the drawings, the front frame 8 is fixed to the front surface 3c2 of the projection 3c of the side sill 3. Therefore, even if a bending force is input from the strut member 22 to the front frame 8 and tending to bend the front frame 8 inwardly, the connection between the front frame 8 and the side sill 3 strongly will resist this force because the bending force will act on the connection between the front frame 8 and the front surface 3c2 of the projection as a shearing force.

At the same time, the reinforcing member 12 forms a "node" in the closed cross section formed by the dashboard lower panel 1 and the rear member 10 so that distortion of the rear member 10 will be prevented. Also, the "node" will transmit load input from the front side frame 8 to the rear surface 3c4 of the projecting portion 3c so that deformation of the projecting portion 3c will be prevented.

Figures 7, 8, 9:
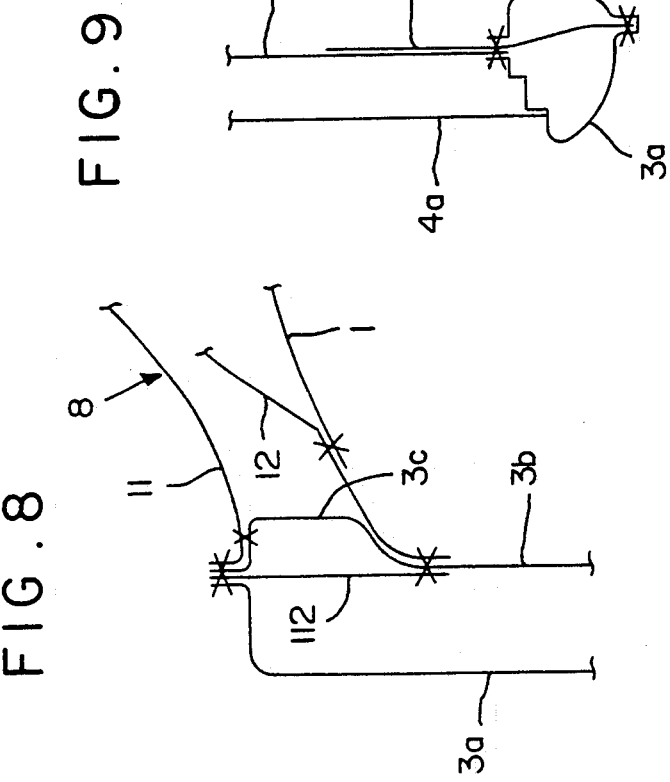
FIG. 7 is a side view of another embodiment of the present invention showing the novel front structure.
FIG. 8 is a sectional view taken along line VIII—VIII of FIG. 7.
FIG. 9 is a sectional view taken along line IX—IX of FIG. 7.

FIGS. 7 to 9 show another embodiment of the present invention. In this embodiment, a reinforcing member 112 is provided in the side sill 3 and connected to the front pillar 4. The reinforcing member 112 is of L shaped configuration. The lower portion 112a of the reinforcing member 112 is sandwiched between the outer panel 3a and the inner panel 3b of the side sill 3 and closes the opening of the projecting portion 3c. The upper portion 112b of the reinforcing member 112 extends above the side sill 3. The upper portion 112b is connected to the inner surface of the inner panel 4b of the front pillar 4. Each Y member is spot-welded at each place indicated by an "x" in FIGS. 8 and 9.

Accordingly, the corner joint formed by the front pillar 4 and the side sill 3 can be further strengthened by the reinforcing member 112 and the projecting portion 3c of the side sill 3 also can be strengthened. The reinforcing member 112 will prevent the front pillar 4 from moving back and the deformation of the projecting 3c when a load is inputs from the front side frame.

FIGS. 10 to 12 show still another embodiment of the present invention. In these embodiment two reinforcing members 113 and 114 are provided at the corner joint formed by the front pillar 4 and the side sill 3. The first reinforce member 113 is of L shaped configuration. The lower portion 113a of the first reinforcing member 113 is sandwiched between the outer panel 3c and the inner panel 3b and connected along the outer surface of the projecting portion or projection 3c. The second reinforcing member 114 is of U shaped configuration lying on the side with the opening facing outward, as shown in FIG. 12. The second reinforcing member 114 is connected to the inner panel 3b to form a closed cross section in the side sill 3. The front end of the second reinforcing member 114 is connected to the outer surface of the projecting portion 3c with the first reinforce member 113. Each Y member is spot-welded at each place indicated by an "x" as shown in FIGS. 11 and 12.

Accordingly, the first reinforcing member 113 will prevent the front pillar 4 from moving back, and the deformation of the projecting portion 3c when a load is input from the front side frame 8. The side sill 3 and corner joint are further strengthened by the second reinforcing member 114.

Although the invention has been described with reference to specific preferred embodiments, changes may be made which do not depart from the inventive concepts taught herein. Such changes are deemed to fall within the purview of the invention as claimed.

We claim:

1. A front structure for a vehicle body having an engine room at its front end, said front structure comprising:

(a) front side frames, each extending in a longitudinal direction of the vehicle body along opposite sides of an engine room and formed of an outer member and an inner member forming a closed cross section, (b) a dashboard lower panel extending vertically and disposed near rear edges of said front side frames, (c) a floor panel extending rearwardly from a lower edge of said dashboard lower panel, (d) side sills, each extending in the longitudinal direction of the vehicle body along opposite sides of the floor panel and formed of an outer panel and an inner panel forming a closed cross section, (e) a projection extending from the front end of each of said side sills, each projection extending inwardly from the front end of each of said side sills relative to said vehicle body and having a front surface extending in a transverse direction of said vehicle body and an inner surface extending generally in a longitudinal direction of said vehicle body, (f) a pair of connecting members, each of said pair of connecting members affixed to one of said front surfaces of said projections and extending inwardly beyond said inner surface and affixed to a rear part of the outer member of one of said front side frames, and (g) a pair of reinforcing members, each of said reinforcing members interposed between said dashboard lower panel and one of said connecting members and affixed to said dashboard lower panel and said one of said connecting members.

2. A front structure as defined in claim 1, and further comprising a suspension assembly, including a strut member and a suspension tower, secured to each of said front side frames, the strut member of each of said suspension assemblies being mounted so that each of said strut members leans inwardly relative to said vehicle body.

3. A front structure as defined in claim 1, wherein said front surface is a vertical wall extending inward relative to said vehicle body, and each said connecting member is secured to said vertical wall.

4. A front structure as defined in claim 1, and further comprising a pair of front pillars extending vertically, each of said front pillars attached at its lower end to one of said side sills, one of said reinforcing members secured to each of said side sills at its inner panel.

5. A front structure as defined in claim 4, wherein each of said reinforcements and one of said projections form a closed cross section.

6. A front structure as defined in claim 4, wherein each of said reinforcing members is secured to another surface of one of said projections.

* * * * *